United States Patent [19]
Barnett

[11] 3,941,157

[45] Mar. 2, 1976

[54] HIGH STRENGTH MULTIPLE PASSAGEWAY PLASTIC CONDUIT

[76] Inventor: Louis H. Barnett, 3631 Incanto Drive, Fort Worth, Tex. 76102

[22] Filed: July 24, 1974

[21] Appl. No.: 491,406

[52] U.S. Cl. ............................. 138/115; 138/177
[51] Int. Cl.² ............................................. F16L 9/18
[58] Field of Search ........................ 138/111–117, 138/177, 178

[56] References Cited
UNITED STATES PATENTS
3,110,754  11/1963  Witort et al. ...................... 138/114

*Primary Examiner*—Houston S. Bell, Jr.
*Attorney, Agent, or Firm*—James C. Fails

[57] ABSTRACT

Conduit means characterized by having a plurality of parallel adjacent, longitudinally extending passageways within an exterior wall and having longitudinally extending ribs extending longitudinally of and exterior to the exterior wall for high flexural strength and high strength enabling bearing high external loads. The passageways have at least a portion of their interior walls in common with adjacent passageways. Preferably, the conduit, including the ribs, are formed of a lightweight, extrudable plastic. Also disclosed are structural details, apparatus, and methods, including one for making any number of passageways in the conduit.

9 Claims, 8 Drawing Figures

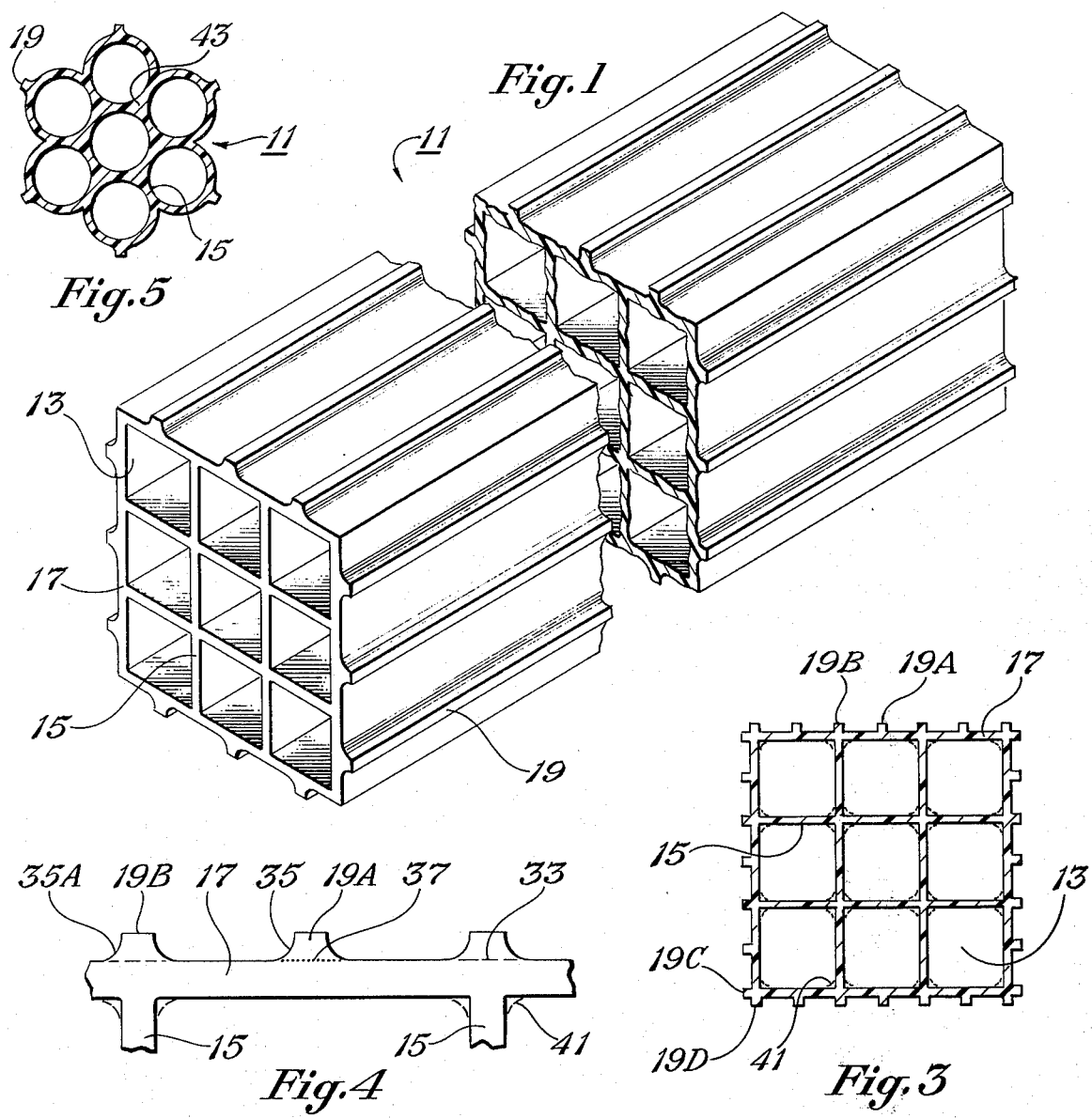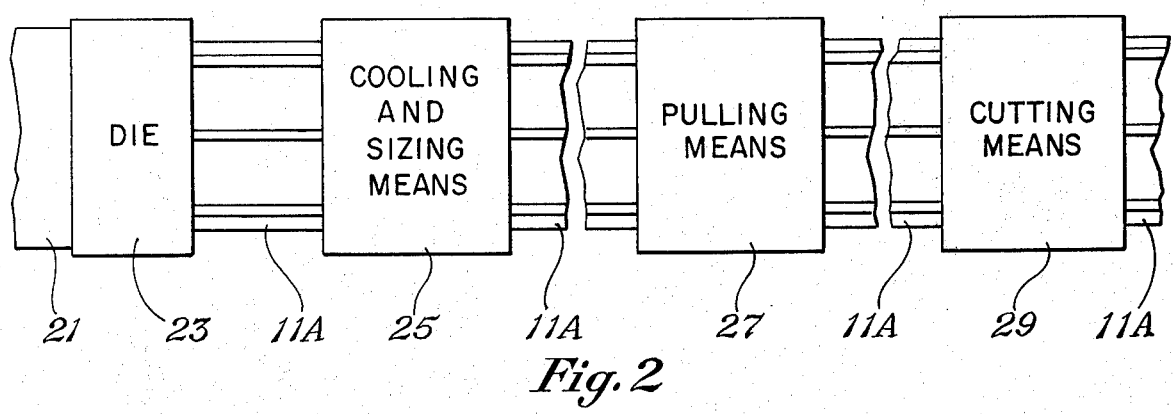

HIGH STRENGTH MULTIPLE PASSAGEWAY PLASTIC CONDUIT

BACKGROUND OF THE INVENTION

1. Field of the Invention

This invention relates to pipe; and, more particularly, it relates to conduit means having a plurality of longitudinally extending passageways.

2. Description of the Prior Art

Conduit means, or pipe, has been used for a wide variety of purposes. One fairly recent innovation that has increased with the advent of underground utilities has been the use of short sections of concrete pipe having a plurality of longitudinally extending passageways. The concrete sections had to be short, since they were so difficult to handle. They were heavy, frangible in the sense of being easily broken when dropped, expensive and inflexible; and were laboriously and expensively joined together because of the large number of joints required to join the short sections into long expanses. Moreover, each of the joints required hand application of an adhesive material to join the sections, further adding to the expense of the installation. Also, the concrete pipe sections were relatively costly to form.

Because of these disadvantages, there has been a more recent increased use of single passageway plastic pipe to replace the concrete because of the obvious advantage of its longer length, light weight and less costly pipes and its less expensive installation. When a plurality of longitudinally extending passageways were desired, the plastic pipes were assembled, or banded together to form bundles. Although advantageous, these bundles were costly to assemble and difficult to install; particularly when joining together longitudinally or making turns, as by elbows; commonly called sweeps.

An attempt has been made to reach a compromise by employing short sections of conduit having a plurality of passageways all having external walls and incorporating lateral structural supports, or ribs, to achieve strength for supporting the external loads. Such plastic conduit were formed by injection molding in short sections. While a large number of pieces of the conduit could be handled on a truck and were advantageous from this point of view, the short sections again necessitated a large number of joinings and joints to form the desired underground conduit.

Thus, it can be seen that the prior art has not provided pipe that has the following desirable features:

1. pipe that can be economically and continuously extruded for economy;

2. pipe that has the strength and economy of manufacture so as to be employed in more elongate sections and reduce the cost of installation; and 3. extrudable plastic pipe that not only has the desired impermeability and imperviousness, resists corrosion over a long period of time but also has the high burst and external load bearing strength to enable direct installation in subterranean locations.

SUMMARY OF THE INVENTION

Accordingly, it is an object of this invention to provide lightweight plastic pipe that obviates the disadvantages of the prior art.

It is a specific object of this invention to provide lightweight plastic pipe that obviates the disadvantages of the prior art and provides all of the features delineated hereinbefore.

These and other objects will become apparent from the following descriptive matter, particularly when taken in conjunction with the appended drawings.

In accordance with this invention, the conduit, or plastic pipe, is provided by extruded plastic conduit (formed of an extrudable plastic) comprising interior walls defining parallel, co-extensive, longitudinally extending passageways; all surrounded by an exterior wall that has longitudinally extending ribs. The longitudinally extending ribs may be provided intermediate the outermost ends of the interior walls, aligned with the outermost ends of the interior walls, or both. The end result is a conduit that will bear 5,000 pounds per foot external loading readily and can be prepared to bear as much as 7,500 pounds per foot, which far exceeds the strength of normal plastic conduit. In fact, the strength is nearly as great as that of the more expensive cross ribbed plastic conduit and the heavy sections of concrete conduit.

BRIEF DESCRIPTION OF THE DRAWINGS

FIG. 1 is an isometric view of one embodiment of this invention.

FIG. 2 is a schematic side elevational view of preferred apparatus and method for manufacturing the embodiment of FIG. 1.

FIG. 3 is a cross sectional view of another embodiment of this invention.

FIG. 4 is a partial end view of the interior and exterior walls and the exterior ribs of FIG. 3.

FIG. 5 is a cross sectional view of another embodiment of this invention with circular passageways arranged in a circular configuration.

DESCRIPTION OF PREFERRED EMBODIMENTS

Figures 7, 8:
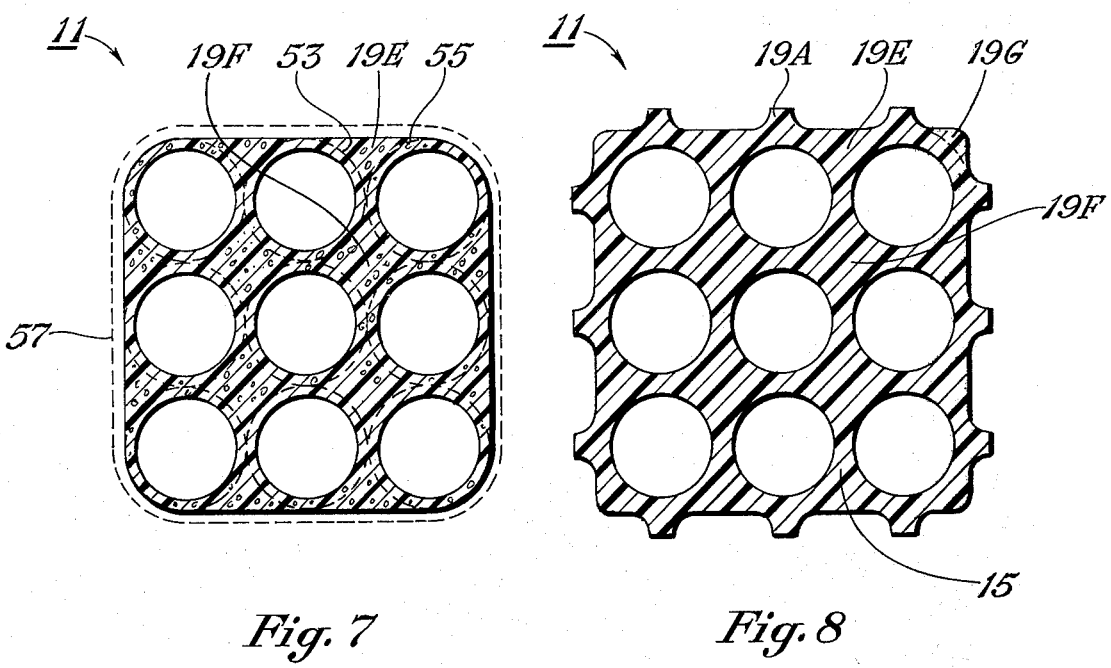
FIG. 7 is a cross sectional view of still another embodiment of this invention with circular passageways arranged in a square configuration, with internal ribs.
FIG. 8 is a cross sectional view of another embodiment of this invention with circular passageways arranged in a square configuration, with both internal and external ribs.

Referring to FIG. 1, the conduit 11 has a plurality of passageways 13 extending longitudinally thereof. The passageways 13 are disposed adjacent each other and are defined by interior walls 15. Exterior walls 17 surround the passageways 13 and the interior walls 15.

A plurality of longitudinally extending ribs 19 are connected with the exterior wall for increasing the external load bearing strength, flexural strength and the pressure resistance of the conduit 11, as explained in greater detail later hereinafter.

The passageways 13 have at least a portion of their interior walls 15, that are not formed by the exterior wall, in common with an adjacent passageway. As illustrated, the interior walls 15, the exterior walls 17 and the longitudinally extending ribs 19 are integrally formed together and are formed of plastic for light weight and imperviousness to corrosion and corroding environments. The plastic end can be sealingly connected together, as described later hereinafter, for holding a positive, or superatmospheric pressure within the conduit 11, if necessary.

The plurality of passageways may comprise any desired number. If each of the passageways has an exterior wall, the conduit may be formed by conventional prior art methods, such as described in U.S. Pat. No. 3,668,288. On the other hand, there may be nine or more passageways, including at least one internal passageway that does not have an exterior wall. Such conduit having a passageway defined totally by interior walls may be formed by injection molding; or by a continuous extrusion process such as described in my co-pending patent application Ser. No. 273,359; filed as a divisional application of an earlier filed application on July 20, 1972; entitled "Method of Forming Multiple Passageway Plastic Conduit"; now U.S. Pat. No. 3,825,641; the details of which are incorporated by reference herein. As was noted therein, the passageways 13 may be circular in cross sectional shape or defined by a plurality of substantially flat sides; such as, square shaped passageways, or the hexagonally shaped passageways. Moreover, the exterior wall 17 may have any suitable cross sectional shape, such as the square shape illustrated in FIG. 1, a rectangular shape where 12 or 14 passageways are employed, a rectangular or square shape modified by rounded corners in cross section, or a circular cross sectional shape, FIG. 5, described later hereinafter.

As illustrated in FIGS. 1 and 2, the longitudinally extending ribs are located externally and laterally intermediate the outermost ends of the internal walls. In this structure, illustrated in close up by rib 19A, FIG. 4, the rib adds flexural strength to the conduit and allows longer conduit sections to be carried without intolerable bending. Moreover, it reduces the tendency of a conduit section to warp when supported at two widely separated points. In addition, the rib 19A adds support to the external wall 17, particularly by the added compressional strength of the rib, to resist deformation, or bending, between its lateral supports on the internal walls 15, even if there are not additional longitudinal ribs located along in alignment with the internal walls, such as absence indicated by dashed lines 33. It is particularly helpful where the rib 19A has a wider base at its point of connection with the exterior wall 17, such as by filet 35.

If desired, the longitudinal ribs may be located in alignment with the outermost ends of the interior walls 15, as shown by ribs 19B. In this position, the longitudinally extending external ribs reinforce the load bearing capability of the interior walls 15, as well as load bearing capability of the exterior wall 17. Moreover, where the external rib 19 has a wider base than the dimensions of the interior wall 15, as illustrated by filet 35A, the shear strength of the exterior wall 17 is increased as well as its resistance to bending because of loads laterally intermediate the interior walls 15, and even without the rib laterally intermediate the interior walls, the absence being illustrated by the dotted line 37.

As illustrated in FIGS. 3 and 4, the exterior ribs 19A and 19B are located at both positions laterally intermediate and over and in alignment with the outermost ends of the interior walls 15 for increased strength over either set of ribs alone.

If desired, filets, or rounded corners, indicated by dashed lines 41, FIGS. 3 and 4, can be employed at all intersecting planar surfaces to facilitate extrusion and to give greater strength.

If desired, the ribs, such as ribs 19C and 19D, FIG. 3, at the corners of the conduit may be omitted. They do add structural strength and frequently will be desirable where high strength conduit is most desired.

Figure 6:
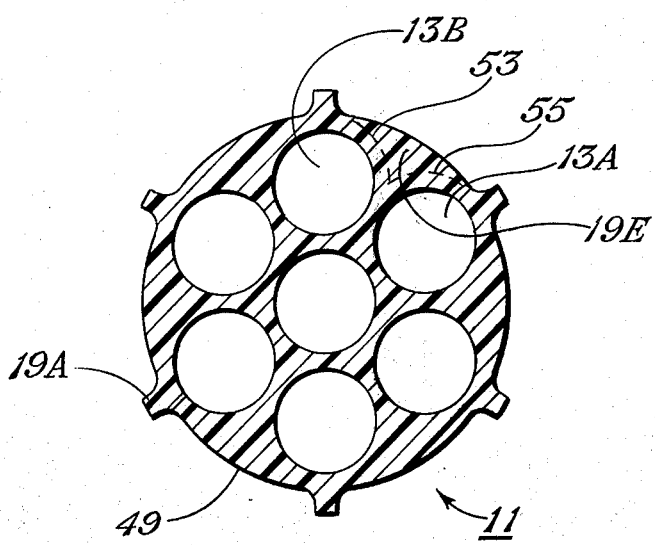
FIG. 6 is a cross sectional view of another embodiment of this invention with circular passageways arranged in a circular configuration.

If desired, the longitudinally extending ribs can be located internally, or interiorly of the exterior walls, as will be described in more detail later herein; particularly with respect to FIGS. 6-8.

One particularly advantageous aspect of an embodiment of this invention is that the conduit means having the plurality of longitudinally extending passageways and the longitudinally extending ribs for greater strength may be produced continuously by an extrusion method to produce the conduit means economically. Basically, the method comprises the steps described in detail in my above referenced application Ser. No. 273,359; and, as indicated hereinbefore, the details of that application are embodied herein by reference for details that are omitted from the brief description hereinafter.

Briefly, the method comprises the following steps: first, molten plastic is extruded through a die means having a plurality of adjacent pin means that are spaced apart so as to define a continuous extrusion passageway around the respective pin means. In this way, the extrusion passageway forms a hot extrudate that is continuous and closed in cross section and that defines the interior walls and the resulting plurality of longitudinally extending passageways. Each passageway, consequently, has at least a portion of its interior, or internal, wall in common with an adjacent passageway. Second, the hot extrudate simultaneously is cooled and sized by effecting a pressure on the interior of the hot extrudate that is higher than the pressure on the exterior of the hot extrudate. External support structure is employed to size and support the exterior walls 17 and the longitudinally extending ribs 19 to prevent distortion of the exterior walls and ribs under the force of gravity and the differential pressure from the interior to the exterior of the extrudate until the extrudate is cool enough to resist such distortion. The interior walls may be supported by a stinger means on the respective pin means for the interior walls, or by a differential pressure, as described in the above referenced Ser. No. 273,359. Third, the extrudate is further cooled to the final conduit means in a non-pliable state. Fourth, the cooled extrudate, or conduit means, is pulled outwardly so as to effect movement of the extrudate away from the die means. Finally, the conduit means is cut into sections of predetermined length by a saw means that effects an exactly square cut; that is, a cut that is perpendicular to the longitudinal axis of the conduit.

The conduit means may be formed from any of the light, exrudable materials, such as the thermoplastic materials; including the foamed plastic, alone or in combination with high strength fibres, such as fibreglass, or strength-adding fillers, such as glass beads, other siliceous pellets, and the like. These thermoplastic materials include the economical polymers, such as polyvinylchloride (PVC); polystryrene; the polyolefinic polymers like high density polyethylene and polypropylene; and the more expensive, but more easily workable copolymers such as acrylonitrilebutadiene styrene copolymer (ABS). A commercially available polyethylene copolymer known as Super Dylan Polyethylene 7180, available from Sinclair-Coppers Company, has a narrow molecular weight distribution and good flow for producing ribbed conduit 11. Specification sheets are available upon request. The raw ingredients which are fed into the apparatus include, in addition to the thermoplastic material, a lubricant; such as, a hydrocarbonaceous material like paraffin; that is comminuted to fine particles and added to the thermoplastic material for lubricating the dies, the pins and the bushings defining the annular space through which the plastic extrudate will be extruded. Also included is a conventional commercial modifier for adding impact resistance. The modifier may be a rubber type compound to prevent brittleness and increase the tensile strength of the pipe, particularly where PVC is employed, since the PVC alone is very brittle. In addition, the appearance of the pipe is improved and its resistance to degradation; for example, degradation in the presence of ultra violet light component of the sunlight during storage; is improved by the addition of a pigment; such as, titanium dioxide or carbon black. Moreover, progress is being made in the use of inert additives, such as calcium carbonate; to add bulk without detrimentally affecting the properties of the conduit. The technology of the various materials which are employed has been well developed in the production of single passageway plastic pipe, particularly in the United States where the sophisticated chemicals were employed to compensate for mechanical equipment that was not as refined as that employed in other parts of the world.

The apparatus for effecting the method of extruding the conduit having the plurality of longitudinally extending passageways is illustrated schematically in FIG. 2. Therein, the apparatus comprises the major elements and assemblies of a blender and extruder means 21, including the die 23; cooling and sizing means 25; and pulling means 27 and cutting means 29.

The blender and extruder means 21 may comprise any of those conventionally employed and available around the world. Since the blender and extruder means 21 is conventional, it need not be described in detail herein, particularly since it has been described in the above referenced Ser. No. 273,359. Basically, it includes a hopper for feeding the pre-blended feed material; such as, the polymer, lubricant and the modifier. The blender and extruder means may comprise a single screw type, or a multiple screw type. Both types of blender and extruder means have been employed in extruding single passageway conduit. Preferably, the multiple screw type is employed for extruding the molten material to form the interior walls 15, the exterior wall 17 and the longitudinally extending ribs 19 in the complex die 23. The blender and extruder means has within it a plasticizer for converting the feed material into a viscous molten mass. Preferably, the plasticizer comprises a plurality of heated screws, or augers, for kneading and heating the feed material to its molten temperature and mixing thoroughly. The blender and extruder means 21 has a set of back screws that are heated by circulation of a hot oil through an inlet conduit and a universal coupling. The hot oil passes outwardly through suitable effluent conduit. A hot oil source is conventionally available in extrusion plants employing such blender and extrusion means 21 and need not be described in detail. If desired, the back screws may be heated electrically by conventionally employed electrical conductors, brushes and slip rings. The back screws comprise a pair of counter rotating screws for mixing the feed material to almost extrudable form, then dropping it vertically into front sets of counter rotating screws for effecting a molten extrudate that is more readily flowable for effecting complicated extrusion profiles with better results. The forward set of screws comprise two or more sets of counter rotating screws that develop a high positive pressure for feeding the plastic through the heating means, such as the electrical heaters in the die means 23.

The respective sets of screws are driven by suitable means, such as electrical motors and the conventionally employed "Dynamatic" drive for variable speed control and the requisite flexibility. Since these drives are conventional they are not shown and described herein.

In addition to the adjustment of the drive means, suitable speed control means and temperature control means are employed and are housed in an air conditioned room separate from the heated screws and the blender and extruder means 21. Desirably, the control room containing the temperature and speed controls will be locked, to prevent adjustment of respective temperature and speed by each shift of employees and to enable continuously producing more nearly uniform conduit. The blender and extruder means 21 may be connected with a vacuum source for drawing air out of a powered feed material if desired.

As described in my above referenced Ser. No. 273,359, the die 23 is firmly, but removably attached to the remainder of the blender and extruder means, as by a strong retention ring with or without additional flanges. A plurality of pin means may be employed cantilevered from a strong spider so as to support the interior walls and define the plurality of extrusion passageways. The number and cross sectional shape of the respective pin means are, of course, designed to affect the number and cross sectional shape of the longitudinally extending passageways of the conduit 11. The strong spider must be able to retain the respective pin means in place against the relatively high force created by the differential pressure tending to force the pin means outwardly. Each of the respective pin means which supports an interior wall of the conduit that is subject to deformation under the force of gravity has a stinger extending longitudinally of the conduit 11 to support the interior walls as each wall is being cooled to a temperature to resist deformation under the force of gravity. Such stingers are illustrated and described in the above referenced Ser. No. 273,359. Cooling is provided by flow of air through the interior of the respective passageways 13 during the extrusion, as also described therein.

Even with liberal flow passageways, a pressure of up to 1,500–2,000 pounds per square inch (psi) may be required to be supplied by the screws in the blender and extruder means 21 to achieve the desired distribution of the plastic such that no interfaces are formed as the molten plastic material joins and flows through the respective extrusion passageways. The details of construction to enable withstanding such high forces are described in the above referenced Ser. No. 273,359. In any event, the conduit 11A, FIG. 2, is extruded outwardly through the die 23 and into the cooling and sizing means 25.

The cooling and sizing means 25 is described in detail in the above referenced Ser. No. 273,359 and need not be described in such detail herein. It is sufficient to note that it may comprise either a chilled liquid water bath, a chilled water spray or a combination of an oil bath followed by the chilled water bath or spray. The hot extrudate is in the form of a soft, shaped conduit means. The respective stingers extend inwardly into the cooling and sizing means 25 for support of the interior walls, since they are otherwise subject to distortion as noted hereinbefore. As illustrated, the cooling and sizing means 25 comprises a vacuum chamber. Specifically, a chilled cooling fluid, such as chilled water, is sprayed into the interior of the cooling and sizing means via suitable conduit and spray heads (not shown) for rapidly chilling the exterior walls. The chilled water is maintained at about 55° F by a conventional refrigeration assembly in conventional plants manufacturing plastic pipe. Such conventional assemblies need not be described herein. The accumulated liquid is withdrawn from the bottom of the cooling means by a suitable vacuum pump (not shown). The partial vacuum may include a gaseous vacuum pump to maintain the vacuum and be controlled by conventional vacuum responsive controls, such as a vacuum pump and vacuum regulator. The vacuum expands the external walls and ribs against a conforming sizer mold. Such a sizer mold has a receiving shape conforming to the exterior shape of the conduit in FIG. 1 and need not be illustrated specifically. Preferably, the sizer includes suitable perforated plates with ports that are so placed as to exactly define the external dimensions of the exterior wall 17 and the ribs 19. Perforations allow the exterior walls 17 and the ribs 19 of the conduit to be forced closely contiguous the interior surfaces for exact sizing, while simultaneously cooling the conduit 11A. The cooling fluid supplied to the interior longitudinally extending passageways creates a positive pressure that is slightly above atmospheric, although the open ends of the respective passageways may be opened to atmospheric pressure at some distance downstream of the pulling and cutting means 27. Thus, the interior pressure in combination with the partially evacuated cooling and sizing means 25 effects a differential pressure across the exterior walls 17 for exact sizing and shaping.

The cooling is rapid within the cooling and sizing means 25, so the hot extrudate is quickly formed into the desired self-sustaining shape of the conduit means having the plurality of longitudinally extending ribs 19. If desired, however, a second cooling means, such as a second cooling chamber (not shown) may be employed. Such a second cooling chamber need not be maintained at vacuum, but may employ conventional chilled water spray heads or a chilled water bath for cooling the exterior walls and the ribs 19.

The conduit means 11A is pulled outwardly at a constant speed by the pulling means 27. The pulling means 27 is similar to the pullers conventionally employed in the extrusion of single passageway conduit; such as, those employing friction belts imposed on respective sides of the conduit, or those employing a plurality of groups of wheels having a resilient covering. In any event, the engaging surfaces, such as belt or resilient covering, have an adjustable dimension therebetween and are adapted for accommodating respective sizes and shapes of the conduit means 11A.

If desired, a labeling means may be employed for marking the conduit with the desired trademarks, instructions or caveats. Such labelers are conventional and need not be described in detail herein.

The continuously moving conduit means 11A is then cut into sections of the desired length by the square cutting means 29. The square cutting means 29 may comprise any means that will effect a square cut. For example, it may comprise a laser beam that severs the conduit, the laser source being movable with the conduit to effect the square cut. As illustrated, the square cutting means is similar to those employed in the extrusion of single passageway conduit and need not be described in complete detail herein. Such square cutting means include the complete electrical system, including motor, starter with thermal overload protection and limit switch actuation of the cutting cycle. Suitable accessories, such as the special acoustical sound absorption equipment may be employed to meet Department of Labor environmental noise standards if desired. The operation of the square cutting means is described in the above referenced Ser. No. 273,359 which has been incorporated herein by reference so it need not be repeated herein. It is sufficient to note that suitable travelling carriage carries the saws with the pipe as the square cut is made and releases the downstream section of conduit for being moved, automatically or by hand, to the storage area.

The cut sections of the conduit means having the plurality of longitudinally extending passageways and the longitudinally extending ribs are then stored for subsequent sale, shipment or use.

The apparatus of FIG. 2 is operable on a 24 hour basis such that, once the extrusion of the conduit means is started, it may be continued indefinitely to meet the desired production schedules.

If desired, cross head dies such as described in the above referenced Ser. No. 273,359, may be employed herein. Moreover, as indicated hereinbefore, a plurality of conduit having at least one exterior wall with the longitudinal ribs may be joined at one or more mating walls with adjacent similar conduit to form the desired number of longitudinally extending passageways. What is imperative, however, is that the exterior walls have the longitudinally extending ribs for the increased strength.

Where ells are to be formed, the conduit may be bent as described in my co-pending application Ser. No. 273,359 and incorporate apparatus such as described in my co-pending application Ser. No. 127,931, entitled "Precision Bending of Plastic Pipe", filed Mar. 25, 1971; now U.S. Pat. No. 3,753,635; the descriptive matter of which is incorporated herein by reference for the details that are not supplied herein. Specifically and briefly, a short section of conduit is heated to the softening temperature and a desired degree of bend effected. Thereafter, the conduit means is cooled, as by spraying with chilled water. As indicated, any degree of automation desired, may be achieved in the bending operation and the subsequent emptying of semi-flexible mandrels or the like to release the bent conduit and put in the shape to be employed. The respective ends of the conduit may be connected by joints of suitable means, such as by suitable bell and spigot ends, with or without gaskets. If it is only necessary to seal at the external joints, a bell and spigot end with a suitable gasket, such as a resilient gasket like that of synthetic rubber, may be employed intermediate the bell and spigot ends, as in conventional practice. If desired, gaskets may be provided intermediate the ends of the interior walls to seal each passageway from another, as well as from the exterior. The joints may be sealed to enable holding a positive pressure on the interior of the conduit, for preventing influx of moisture or the like, or even containing poisonous gases. For example, polyvinylchloride has its own commercially available adhesive systems, as does ABS. The polyolefinic plastic materials do not have a satisfactory adhesive system, but may be joined by heat, or welded, when they are abutted or overlapped. Moreover, the conduit has sufficient structural strength to sealingly engage a resilient gasket or the like. A suitable coupling was described in the above referenced Ser. No. 273,359 and may be employed for joinder of the ends of the conduit, either sealingly or as desired. Such couplings may be formed by any of the well known processes, such as by rotational casting, described in my U.S. Pat. Nos. 3,314,639; 3,315,314; 3,341,896; and 3,388,429. The shrinkage factors, as well as the mechanical devices for effecting the desired taper and "sizing" of both the coupling means and the ends of the conduit are known in the plastic art and need not be described in detail herein. The butt joints so formed are nearly enough perfect to prevent snagging of cables or turbulence of materials flowing through the respective longitudinally extending passageways.

Another embodiment in which the multiple passageway conduit 11 has seven passageways arranged in a circular configuration to simulate a tubing bundle is illustrated in FIG. 5. Therein, the passageways are circular, as formed by cylindrically shaped pins. The ribs 19 are disposed peripherally on the exterior of the exterior walls of the respective individual conduits being concurrently extruded. The interior walls are illustrated as being integral for extra strength. The solid filets 43 intermediate the respective interior walls 15 facilitate extrusion and are particularly helpful when the plastic material comprises foamed plastic, with or without added high strength fibres or other fillers.

A number of other structures will become apparent from the foregoing descriptive matter. For example, as illustrated in FIG. 6, the conduit 11 may have a cylindrical exterior 49 with internal ribs 19E intermediate the respective walls of adjacent exterior passageways; such as 13A and 13B. The imaginary boundaries of the walls defining the internal rib 19E intermediate the respective passageways 13A and 13B are shown in dashed lines 53 and 55. Additionally, external ribs 19A are illustrated disposed at the periphery covering the thinnest part of the cross section for added strength.

To further illustrate the passageways, which are illustrated in FIGS. 7 and 8 as cylindrical, or circular in cross section, can be arranged in square or rectangular configurations. Moreover, the conduit 11 can have only internal ribs 19E and 19F, FIG. 7; or it can have the internal ribs 19E, 19F, external ribs 19A, 19G (at the corners), and any or all combinations thereof, as desired. Referring to FIG. 7, the outer wall may be made double thickness for extra strength so its outer dimensions would be as illustrated in dashed lines 57. This structure is particularly useful if a densified plastic skin is to be formed about a foamed plastic core. Referring to FIG. 8, internal ribs, in combination with the interior walls 15, form strong supporting columns for withstanding high external loads. The external ribs 19A and 19B add structural strength at the line of minimum cross sectional thickness of the exterior wall-rib combination. The end result is a surprisingly strong conduit that can be installed in long lengths at costs much less than conventional.

In the embodiments described and illustrated hereinbefore, the longitudinally extending ribs are parallel with, or make an angle of 0° with respect to, the longitudinal axis of conduit 11. It is imperative that the ribs make an angle of less than 45° with respect thereto to be feasibly extrudable. Even with an angle less than 45° but more than 0°, the necessity to accommodate the spiralling ribs, as by rotation of the sizer mold, creates production problems greater than for the 0°, or straight and parallel, ribs.

From the foregoing descriptive matter and drawings, it can be seen that this invention has the desirable features delineated hereinbefore and not heretofore provided. The conduit means has the plurality of longitudinally extending passageways for an economical conduit and has the plurality of longitudinally extending ribs for the greater structural strength. The conduits can be employed in long lengths so they are economically advantageous in installation as compared with either the shorter lengths of concrete, the bundling of a plurality of single conduits or the use of the short cross ribbed plastic conduits. In short, the invention accomplishes the objects delineated hereinbefore.

Although this invention has been described with a certain degree of particularity, it is understood that the present disclosure has been made only by way of example, and that numerous changes in the details of construction and the combination and arrangement of parts may be resorted to without departing from the spirit and the scope of this invention.

What is claimed is:

1. A corrosion resistant conduit means adapted for being buried underground and the like without crushing comprising:
   a. a plurality of interior walls defining a plurality of at least seven longitudinally extending adjacent passageways; at lease one of said passageways being an interior passageway that is completely surrounded by exterior passageways such that all of its walls are precluded from having external cooling by a media exteriorly of said conduit means; said interior walls comprising an extrudable plastic that is substantially uniform in cross sectional texture and density, that is free of any interface and imperfections formed by joining exterior walls, and that is free of an intolerable thermal sag due to sagging of the pliable plastic before it can be cooled;
   b. an exterior wall covering said longitudinally extending passageways and integrally formed with the outermost ends of said interior walls; said exterior wall comprising an extrudable plastic and subject to being crushed inwardly by the weight of dirt thereover when not reinforced by ribs and buried in the earth; and
   c. a plurality of longitudinally extending ribs integrally formed with said exterior wall; said ribs being external ribs that are disposed exteriorly of said exterior wall; said plurality of ribs reinforcing said exterior wall and increasing the flexural strength of said conduit and the exterior pressure resistance of said conduit such that longer sections of said conduit can be carried and installed for economy of installation; and such that corrosion resistance and large load carrying capability and soil resistance allow said conduit means to be employed in subterranean locations that would otherwise corrode metallic conduit and the like.

2. The conduit of claim 1 wherein said ribs are located laterally intermediate and longitudinally parallel with the outermost ends of the internal walls.

3. The conduit of claim 2 wherein said external rib comprises one large rib intermediate each two adjacent outermost ends of said internal walls.

4. The conduit off claim 2 wherein said ribs are also located in line with the outermost ends of said internal walls for still greater strength.

5. The conduit of claim 1 wherein said ribs are external ribs that are located in line with the outermost ends of said internal walls.

6. The conduit of claim 1 wherein said ribs form an angle of less than 45° with respect to the longitudinal axis of said conduit.

7. The conduit of claim 1 wherein said ribs also include external ribs disposed along a line of minimum cross sectional thickness of said exterior wall for high structural strength.

8. The conduit of claim 1 wherein there are at least nine said longitudinally extending adjacent passageways and said passageways have substantially the same dimensions in cross section.

9. The conduit of claim 8 wherein said passageways have substantially rectangular cross sectional shape.

* * * * *